Figure 1:
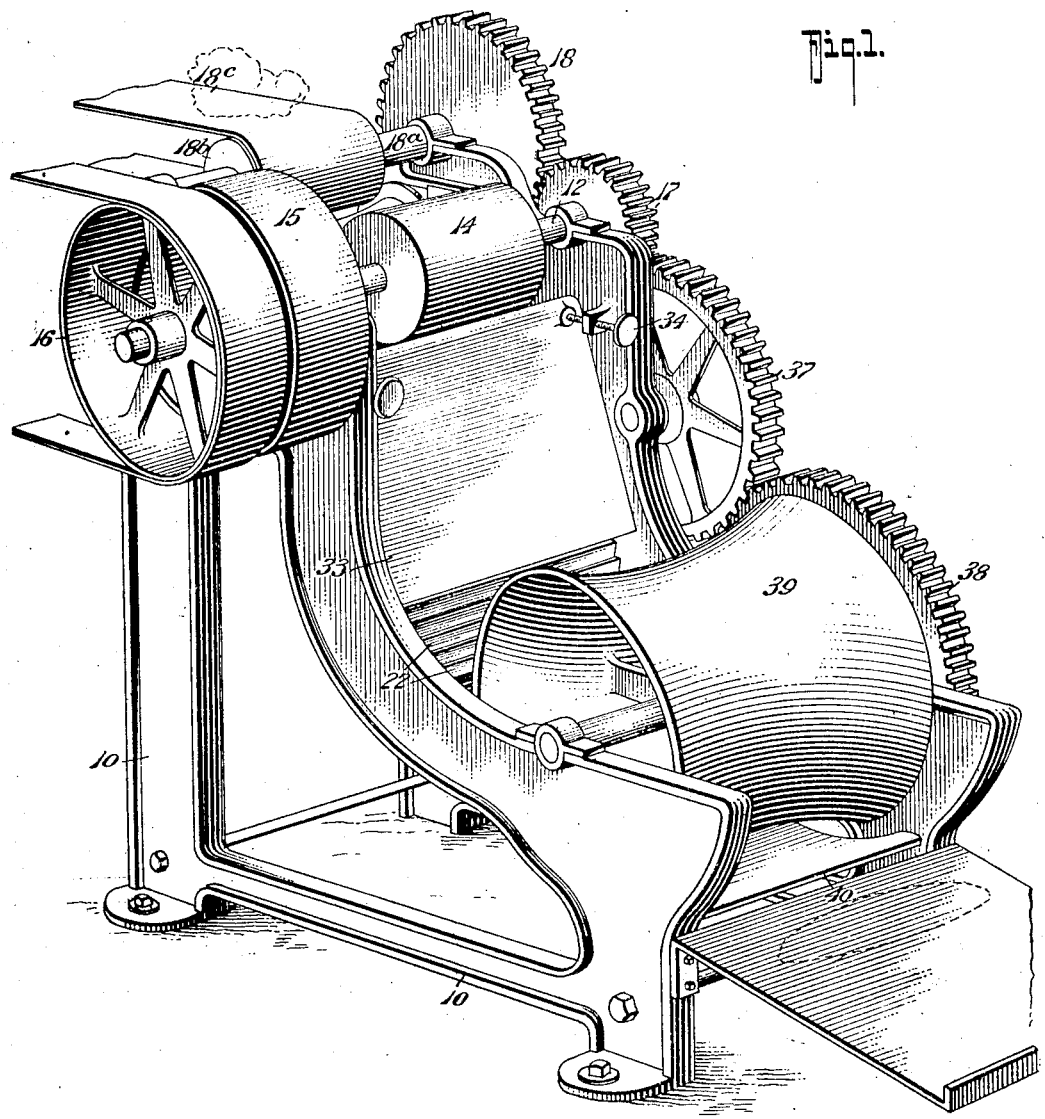

No. 875,930. PATENTED JAN. 7, 1908.
H. HUEG.
DOUGH SHAPING MACHINE.
APPLICATION FILED AUG. 8, 1906.

2 SHEETS—SHEET 1.

WITNESSES:
John T. Schrott
O. B. Gibson.

INVENTOR
Herman Hueg.

BY
Fred G. Dieterich & Co.
ATTORNEYS

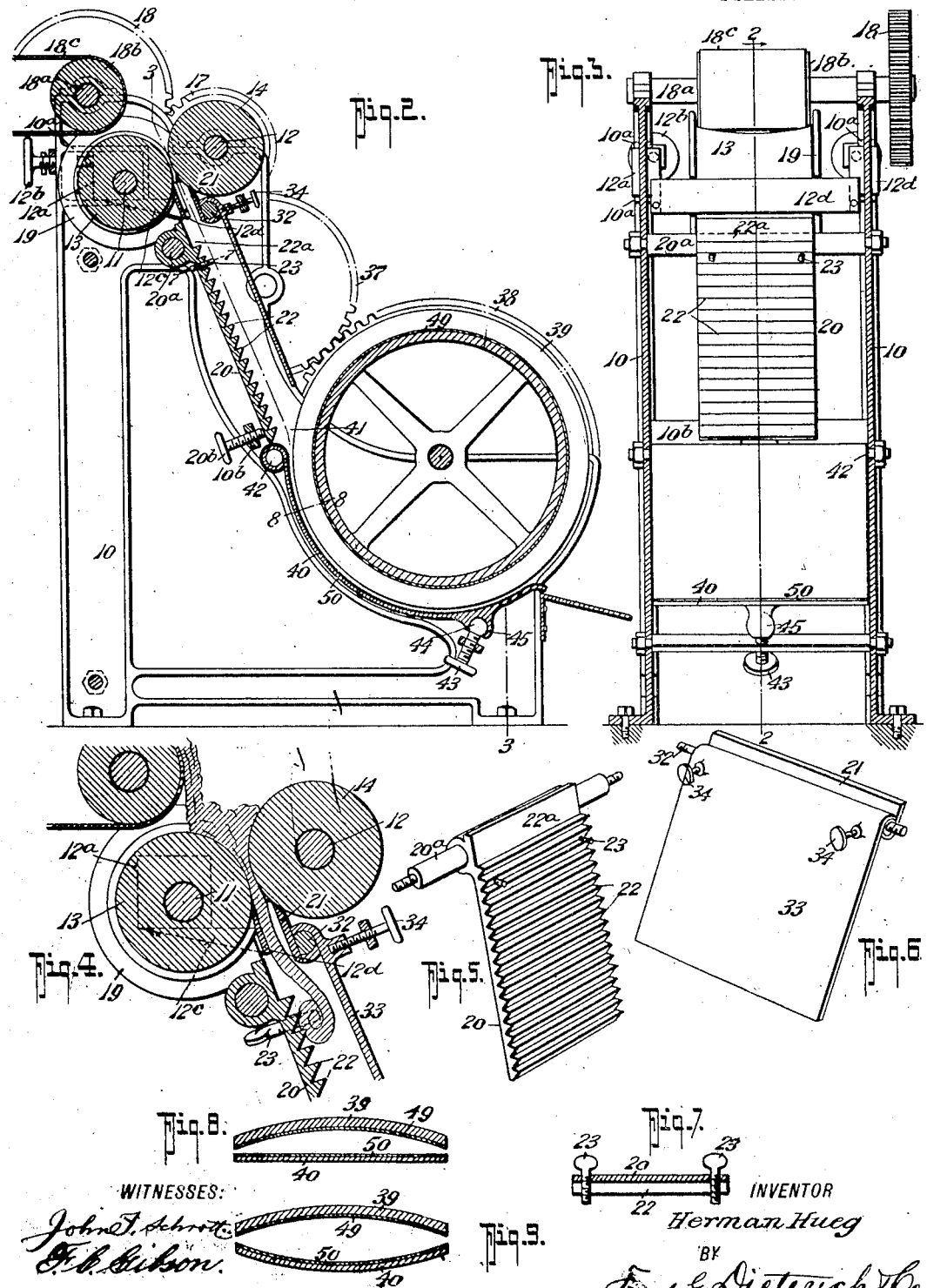

UNITED STATES PATENT OFFICE.

HERMAN HUEG, OF NEW YORK, N. Y.

DOUGH-SHAPING MACHINE.

No. 875,930.

Specification of Letters Patent.

Patented Jan. 7, 1908.

Application filed August 8, 1906. Serial No. 329,730.

*To all whom it may concern:*

Be it known that I, HERMAN HUEG, of the city of New York, (Queens,) in the county of Queens and State of New York, have invented a new and Improved Dough-Shaping Machine, of which the following is a specification.

My present invention, which generally relates to an improved machine for shaping dough that has been previously divided into batches of the desired sizes, preferably by a dough dividing machine, more particularly refers to an improvement on the machine disclosed in my co-pending application filed March 6, 1906, and my said present invention primarily seeks to provide certain improvements in the structure of the machine referred to, whereby to render the same the more efficient and positive in its use, and whereby the manufacture thereof is made more economical.

Generally stated, the machine disclosed in my other application referred to, comprehends a drum, a shaping apron combined therewith, for forming the dough to the desired loaf shapes, feed rolls for delivering the batches to the drum, and a coiling means intermediate the drum and feed rolls provided for turning and coiling the dough batches as they leave the feed rolls and are fed into engagement with the shaping drum.

My present invention, in its broad features, embodies an improved construction of, and the manner of adjustably mounting the coiling means, coöperatively combined with devices for positively leading the dough to the said coiling means whereby to effect the initial turning or coiling action thereof.

My present invention also comprehends an improved construction and arrangement of the dough feeding rolls, including adjusting means, a scraper for each roll, the one for the adjustable roll being connected with and arranged to be moved by the roll adjusting devices, the said scrapers being relatively so combined whereby to form a throat way for the passage of the dough, independent of the coiling means.

In its more subordinate features, my present invention embodies certain details of construction, and peculiar combination of parts, including an improved positioning of the shaping drum and the delivery end of the coiling plate whereby the operation of taking in, the shaping, and the delivering actions of the drum, is rendered positive and uniform, all of which will be hereinafter fully described, specifically pointed out in the appended claims, and illustrated in the accompanying drawings, in which:—

Figure 1, is a perspective view of my improved dough shaping machine. Fig. 2, is a vertical longitudinal section thereof, taken practically on the line 2—2 on Fig. 3. Fig. 3, is a transverse vertical section of the same taken on the line 3—3 on Fig. 2. Fig. 4, is a vertical section of the feeding in rolls and the coiling mechanism, and showing the manner in which the initial coiling or rolling of the dough is effected. Fig. 5, is a detail view of the coiling plate. Fig. 6, is a similar view of the guard plate and the stationary scraper formed as an integral portion of the upper or pivotal end thereof. Fig. 7, is a detail horizontal section, taken on the line 7—7 on Fig. 2 and looking in the direction indicated by the arrow. Fig. 8, is a cross section thereof on the line 8—8 on Fig. 2. Fig. 9, is a similar view of the modified form of the drum and apron, hereinafter referred to.

In my present construction of dough shaping machine, the frame 10 preferably is the shape generally disclosed in Fig. 1 of the drawings and in the upper end of the frame are journaled the shafts 11 and 12 that carry the feeding in rollers 13 and 14. The shaft 11 of the rear or inner roller, is mounted in adjustable bearings $12^a$ slidably held for horizontal adjustment in the slot-ways $10^a$ of the frame and each of the bearings $12^a$ are connected with the adjusting screws $12^b$ as best shown in Fig. 2, by reference to which it will be observed that to the adjustable bearing members $12^a$ is connected a cross plate $12^c$, to the outer edge of which is fastened a scraper blade $12^d$ which has fixed relation with respect to the rollers 13 at all times, since it moves with the roller and the adjustable boxes therefor when the same are set by the adjusting screws, before referred to.

When the machine is to mold "Vienna" bread, the rolls 13 and 14 are of concaved form, but it will be understood that the shape of the said rollers, in practice, is governed by the character or shape of the bread loaf to be formed.

In my present construction, the outer shaft 12 carries the fast and loose pulleys 15 and 16 and the said shaft is provided with the drive gear 17 that meshes with the gear 18 on the shaft 18ᵃ that carries a pulley 18ᵇ, over which the dough delivery apron 18ᶜ passes, as clearly shown in Figs. 1 and 2, it being understood that the adjacent feed roller 14 is rotated by reason of frictional contact with the dough that is forced down by the said rollers 13 and 14. In my present case, the roller 13 has flanges 19 that flank the other roller 14.

The inclined coiling plate 20 in the present case is pivotally hung on the cross rod 20ᵃ and the said plate is pendently disposed and at a suitable angle with respect to the line of discharge of the feed rollers 13 and 14, the angle of inclination of the said coiling plate being adjustable by means of the screws 20ᵇ that engage with the frame brackets 10ᵇ, as shown. In the present construction, instead of forming the coiling plate with a series of longitudinal ribs, I arrange the said ribs 22 transversely thereof and the uppermost rib forms the offset 22ᵃ, with which the dough sheet, as it passes from the feed rolls, engages and by means of which the movement of the said dough sheet is arrested and the lower end thereof is caused to make its initial coil or roll.

To provide for positively arresting the dough coil as it passes down over the coiling plate and to cause it to continuously roll or coil upon itself, I prefer to make the ribs 22 of a substantially triangular shape but with the dough abutting surfaces in a plane at right angles to the longitudinal axis of the coiling plate, and to provide for holding the dough to positively engage with the said ribs as it passes down over the coiling plate, I provide a guard plate 33 which is hung upon the rod 32 and set to its desired position by means of the set screw 34, and in the present construction, I form the upper end of the guard plate 33 with the stationary scraper 21 which coöperates with the roller 14 and which is so disposed relatively to the scraper for the other roller, whereby to form a throat-way, through which the dough sheet from the feed roll passes and by referring now to Fig. 2, it will be observed that in my present construction the two scrapers are so disposed with relation to the ribs of the coiling plate that the dough, in passing down, is fed to positively engage with the upper tooth or rib, this being an essential advantage over the arrangement of the scrapers in the construction disclosed in my pending application referred to.

Instead of using longitudinal side guides or flanges, as shown, I simply provide a pair of screws 23, adjustably mounted in the opposite ends of the coiling plate, which are located one at the upper or entrant end of the said plate and in such manner as to prevent a lateral swerving of the dough as it is started down upon the coiling teeth or ribs. By reason of forming the coiling ribs transversely instead of longitudinally, as in my other application referred to, and locating the abutting surfaces of the upper cross rib as shown, relatively to the throat-way between the scrapers, a pocket for retarding the end of the dough sheet as it passes between the scrapers, is provided and performs the same functions as the special construction of pocket 24 shown in my other application referred to. By thus forming the coiler and arranging the scrapers as stated, it will be apparent that when the bottom of the dough sheet passes down between the scrapers, by reason of engaging with the upper transverse rib, it will be detained for a sufficient period to cause the dough sheet to roll up in a coil, as indicated in Fig. 4. The scrapers that engage the rollers 13 and 14 have their scraping edges shaped to suit the transverse shape of the said rollers as will be readily understood from the drawings.

By referring now more particularly to Fig. 2, it will be noticed that in my present construction, the shaping roller is disposed a distance considerably further from the line of feed to the dough than is the case in my co-pending application. In other words, in my present construction, instead of the dough roll as it passes from the coiling plate, engaging with the shaping roll at a point almost in vertical alinement with its axis, by reason of the location of the discharge end of the coiling plate relatively to the shaping roll, it is caused to engage with the said roll at a point practically below the horizontal axis of the said roll and by reason thereof, the coiling or dough roll is caused to move in a practically uninterrupted and continuous direction, since in my present construction, the pivotal connection 42 of the apron 40, is at a point in horizontal alinement with the axis of the shaping drum 39, which, in my present machine, together with the apron 40, is covered with canvas, indicated by 49 and 50 in the drawings, and the apron 40 may be either of a straight form as shown in Fig. 8 or it may be concaved as shown in Fig. 9, according to the shape to be imparted to the loaf.

Instead of making the bearing for the shaft 12 adjustable, the said bearing may be a fixed one if desirable, it being understood that any considerable adjustment of the shaft 12 away from the shaft 11 will be compensated for by changing the relative diameters of the gears 17 and 18 and 37 and 38, the latter of which transmit the required motion to the shaping drum.

The dough roll or coil, as it leaves the coiling plate, drops into a channel 41 between the apron and shaping drum and as it is carried along through the said channel by the rotation of the drum, it is molded to assume its final shape, and when thus shaped, it is delivered from the channel onto a shelf, as shown in Fig. 1, but it may be delivered onto an endless carrier as shown in my other application and when the latter is used, the loaf may be conveyed directly to the oven.

As in my other application referred to, the apron in the present case is adjustable, it being provided with a socket 45 on the lower end for engaging with the ball end 44 of the adjusting screw 43, the adjustment of which provides for a desired positioning of the apron 40 with respect to the shaping drum.

Having thus described my invention, what I claim and desire to secure by Letters Patent, is:—

1. In a dough shaping machine, a pair of feed rollers, and a drum, and a means intervening the drum and feed rolls for leading the dough to the drum and coiling it into a roll as it is being fed to the drum, and an adjustable guard plate coöperating with said intervening means substantially as shown.

2. In a dough shaping machine, a pair of feed rollers and a drum, a ribbed coiling plate, and a guard plate that coöperates with the coiling plate.

3. In a dough shaping machine, a pair of feed rollers and a drum combined with an intervening coiling plate and means on the said coiling plate for preventing the dough from moving laterally off the plate, as set forth.

4. In a dough shaping machine, a pair of feed rolls and a drum combined with an intervening coiling plate having transverse ribs and means at the receiving end for preventing the dough from spreading laterally off the plate, for the purposes set forth.

5. In a dough shaping machine, a pair of feed rollers, combined with a drum, a scraper for each of the said rollers, said scrapers forming a throatway for the passage of the compressed dough sheet, a coiling plate located between the said throatway and the drum, said plate having a member for retarding and turning the end of the dough sheet as it passes through the throatway formed by the scrapers.

6. In a dough shaping machine, a pair of feed rollers, an adjustable bearing for one of said feed rollers, and a drum combined with an intervening coiling plate having a series of transverse ribs and an adjustable guard plate for coöperating with the coiling plate.

7. In a dough shaping machine, a pair of feed rolls and a drum combined with a coiling plate having transverse ribs, a pair of scrapers coöperating with the feed rolls and forming a throatway for the passage of the dough sheet, said coiling plate having its ribs projected in line of the said throat-way, for the purposes described.

8. In a dough shaping machine, a pair of feed rolls, a shaping drum, a feed way for leading the dough from the rolls to the shaping drum, said feed way comprising a transversely ribbed plate whose ribs project in the line of feed of the dough from the rolls, and a guard coöperating with the ribbed plate, as set forth.

9. In a dough shaping machine, feed rolls and a drum combined with an intervening adjustable coiling plate and an intervening guard plate that coöperates with the coiling plate and scrapers for the feed rolls.

10. In a dough shaping machine, feed rollers and a drum combined with an intervening adjustable coiling plate and an intervening guard plate for the coiling plate, a scraper for each of the feed rollers, one of the said scrapers being fixedly connected with the guard plate, as set forth.

11. In a dough shaping machine, a pair of feed rolls, and a drum combined with an intervening ribbed coiling plate pivotally supported at its upper end at a point adjacent the line of delivery of the feed rolls, its lower end being located adjacent the entrant portion of the drum and means for adjusting the lower end of the coiling plate with respect to the drum and an adjustable guard plate coöperating with said ribbed coiling plate, as set forth.

12. In a dough shaping machine, a pair of feed rolls and a drum, a throatway at the discharge of the feed rollers, said throatway consisting of a pair of opposing scraper members that coöperate with the feed rolls, and a coiling plate having transverse ribs pivotally supported at its upper end with the uppermost rib projecting in the line of the throatway, and means at the lower end of the coiling plate for adjusting said lower end with respect to the drum, substantially as shown and for the purposes described.

13. In a dough shaping machine, a pair of feed rollers, combined with a drum and an apron therefor, together with a transversely ribbed coiling plate mounted between said drum and said feed rollers and adjustable stops projecting through said ribbed coiling plates substantially as shown and described.

14. In a dough shaping machine, a pair of feed rollers, combined with a drum and an apron therefor, together with a transversely ribbed coiling plate mounted between said drum and said feed rollers, adjustable stops projecting through said ribbed coiling plate and an adjustable guard plate coöperating with said coiling plate substantially as shown and described.

HERMAN HUEG.

Witnesses:
ADOLF GLENEWINKEL,
LOUIS W. HUEG.